(12) United States Patent
König et al.

(10) Patent No.: US 7,380,877 B2
(45) Date of Patent: Jun. 3, 2008

(54) CHILD SEAT

(75) Inventors: Walter König, Münsingen (DE); Uwe Schobert, Kirchenlamitz (DE)

(73) Assignee: Concord GMBH, Stadtsteinach (DE)

( * ) Notice: Subject to any disclaimer, the term of this patent is extended or adjusted under 35 U.S.C. 154(b) by 0 days.

(21) Appl. No.: 10/562,849

(22) PCT Filed: Jun. 30, 2004

(86) PCT No.: PCT/DE2004/001366
§ 371 (c)(1), (2), (4) Date: Apr. 24, 2006

(87) PCT Pub. No.: WO2005/002906
PCT Pub. Date: Jan. 13, 2005

(65) Prior Publication Data
US 2006/0267387 A1    Nov. 30, 2006

(30) Foreign Application Priority Data
Jul. 2, 2003 (DE) ................. 103 29 924

(51) Int. Cl.
*B60N 2/26* (2006.01)
*B60R 22/00* (2006.01)
(52) U.S. Cl. .............. 297/250.1; 297/483; 297/185
(58) Field of Classification Search ............. 297/250.1, 297/482, 485, 483
See application file for complete search history.

(56) References Cited

U.S. PATENT DOCUMENTS

| | | | |
|---|---|---|---|
| 4,854,639 A * | 8/1989 | Burleigh et al. ......... | 297/250.1 |
| 5,468,020 A | 11/1995 | Scime | |
| 5,678,887 A * | 10/1997 | Sher ......................... | 297/250.1 |
| 6,682,143 B2 * | 1/2004 | Amirault et al. .......... | 297/250.1 |
| 6,908,151 B2 * | 6/2005 | Meeker et al. ............ | 297/250.1 |
| 6,986,548 B2 * | 1/2006 | Jane Santamaria ....... | 297/250.1 |
| 7,232,185 B2 * | 6/2007 | Hartenstine et al. ..... | 297/250.1 |
| 2001/0011838 A1 | 8/2001 | Kassai et al. | |
| 2005/0035635 A1* | 2/2005 | Hendrikus ................ | 297/250.1 |

FOREIGN PATENT DOCUMENTS

| | | |
|---|---|---|
| DE | 295 10 642 | 6/1996 |
| EP | 0 326 265 | 8/1989 |
| EP | 0 781 685 | 7/1997 |
| EP | 0 853 019 | 7/1998 |

* cited by examiner

*Primary Examiner*—Sarah B McPartlin
(74) *Attorney, Agent, or Firm*—Schweitzer Cornman Gross & Bondell LLP

(57) ABSTRACT

A child seat (10) with a seat shell (12) and with a backrest (14) is described. The seat shell (12) is designed with a lap-belt guide (18) for a vehicle lap belt. The backrest (14) has a head restraint (20) with lateral flanks (22), a respective diagonal-belt guide (26) for a vehicle diagonal belt of a vehicle three-point belt being provided on the lateral flanks (22). The diagonal-belt guide has a slot (28) which is open to the front, does not clamp the belt and has a belt-retaining section (30). The belt-retaining section (30) directly and immediately adjoins the front-side slot opening (32) of the slot (28). A spring-loaded closure element (34) is provided on the front-side slot opening (32), the closure element enabling the vehicle diagonal belt to be threaded in a simple manner through the slot opening (32) into the slot (28) and blocking the slot opening (32) in its normal closure position in a spring-loaded, prestressed manner.

4 Claims, 4 Drawing Sheets

CHILD SEAT

The invention relates to a child seat with a seat shell which has a lap-belt guide for a vehicle lap belt, and with a backrest which has a head restraint with lateral flanks, a respective diagonal-belt guide for a vehicle diagonal belt of a vehicle three-point belt being provided on the lateral flanks, the diagonal-belt guide having a slot which is open to the front, does not clamp the belt and has a belt-retaining section.

A child seat of this type is known from EP 0 781 685 A1 of the applicant. In the case of this known child seat, the diagonal-belt guide can firstly be formed in the manner of an inverted walking stick, with the belt-retaining section on the respective lateral flank of the head restraint pointing upward and being closed toward the front in order to prevent an undesired removal of the diagonal belt of the vehicle three-point belt from the diagonal-belt guide. However, the walking-stick-like design of the diagonal-belt guide necessitates a complicated threading-in of the diagonal belt into the diagonal-belt guide. The front-side slot opening of the diagonal-belt guide is adjoined by an at least approximately horizontal belt-threading-in section through which the diagonal belt has to be threaded and subsequently has to be pivoted through approx. 90° in order to reach the upwardly oriented belt-retaining section. This pivoting of the diagonal belt constitutes a handling outlay which cannot be ignored and in an extreme situation leads to an insecure or unreliable fixing of the diagonal belt.

DE 295 10 642 U1 discloses a child seat which has a height-adjustable head restraint with lateral flanks. Each lateral flank is provided on the front side, i.e. end side, with a clamping device for a diagonal belt. In the case of this known child seat, the diagonal belt is clamped with the aid of the clamping device.

US 2001/0011838 A1 discloses a child seat with a seat shell and a backrest on which lateral flanks can be displaced between a first and a second position. In the first position, the lateral flanks bear tightly against the side edge of the backrest and close diagonal-belt guide slots opening laterally out of the backrest. In the second position, the lateral flanks are spaced apart from the side edge of the backrest, so that it is possible to introduce a diagonal belt into the respective diagonal-belt guide slot.

The invention is based on the object of providing a child seat of the type mentioned at the beginning, in which the respective diagonal-belt guide is of simple design and the diagonal belt can be threaded in a simple manner into the corresponding diagonal-belt guide, with the diagonal belt being securely and reliably held in the diagonal-belt guide after being threaded in.

According to the invention, this object is achieved in the case of a child seat of the type mentioned at the beginning by the diagonal-belt guides being provided on the lower edge of the two lateral flanks of the head restraint, by the belt-retaining section directly adjoining the front-side slot opening of the slot of the respective diagonal-belt guide, and by a spring-loaded closure element being provided on the front-side slot opening, the closure element enabling the vehicle diagonal belt to be threaded in a simple manner through the slot opening into the slot, blocking the slot opening in its normal closure position in a spring-loaded, prestressed manner and being formed integrally with an actuating button which is provided on the outer side of the corresponding lateral flank, in a manner which is unreachable by a child in the child seat.

Owing to the fact that, according to the invention, a respective diagonal-belt guide is provided on the lower edge of each of the two lateral flanks of the head restraint, it is possible to reliably fix the child seat both to the right side and also the left side of a vehicle with the aid of the associated, vehicle's own three-point belt, with not only the child seat but at the same time also the child in the child seat being secured with the aid of the vehicle three-point belt.

During the threading of the vehicle diagonal belt into the slot, the spring-loaded closure element is displaced with the aid of the vehicle diagonal belt and the front-side slot opening is released. In the process, the mechanical stress of the spring-loaded closure element is increased. As soon as the vehicle diagonal belt is situated in the slot, i.e. in the belt-retaining section, the closure element is released from the vehicle diagonal belt, with the result that the spring-loaded closure element is correspondingly mechanically relaxed and automatically returned into the blocking position in which the slot opening of the slot is then blocked, so that the vehicle diagonal belt is prevented from inadvertently being removed from the slot.

In order to achieve optimum maneuverability of the child seat according to the invention, it is expedient if the diagonal-belt guides are designed with a smooth surface.

It is expedient if the respective diagonal-belt guide on one edge of the slot has a cutout in which the spring-loaded closure element rests in a defined manner in the closure position. In this case, the closure element can be designed as a flap which can be displaced about a spindle, which is provided in the vicinity of the other edge of the slot, between the normal closure position and a belt-threading-in position. In this case, the closure element is already arranged in the normal closure position on said spindle in a mechanically defined, prestressed manner. The mechanical stress of the closure element is then correspondingly increased in the belt-threading-in position.

According to the invention, the closure element is formed integrally with an actuating button with the aid of which it is possible to displace the closure element from the normal closure position into a belt-removing position, which corresponds to the belt-threading-in position, in order, when the need arises, to be able to remove the vehicle diagonal belt in a simple manner from the slot of the diagonal-belt guide. For this purpose, according to the invention the actuating button is provided on the outer side of the corresponding lateral flank, in a manner which is unreachable by a child in the child seat, so that the child in the child seat cannot inadvertently displace the closure element into the belt-removing position.

In the case of the child seat according to the invention, the head restraint can be formed as a single part with the backrest. It is similarly possible for the head restraint to be provided in a height-adjustable manner on the backrest. A child seat of the last-mentioned type has the particular advantage of being readily suitable for children of different heights, so that costs of purchasing child seats for children of different heights can be saved.

Further details, features and advantages emerge from the description below of an exemplary embodiment, illustrated in the drawing, of the child seat according to the invention and of essential details of the same.

Figure 1:
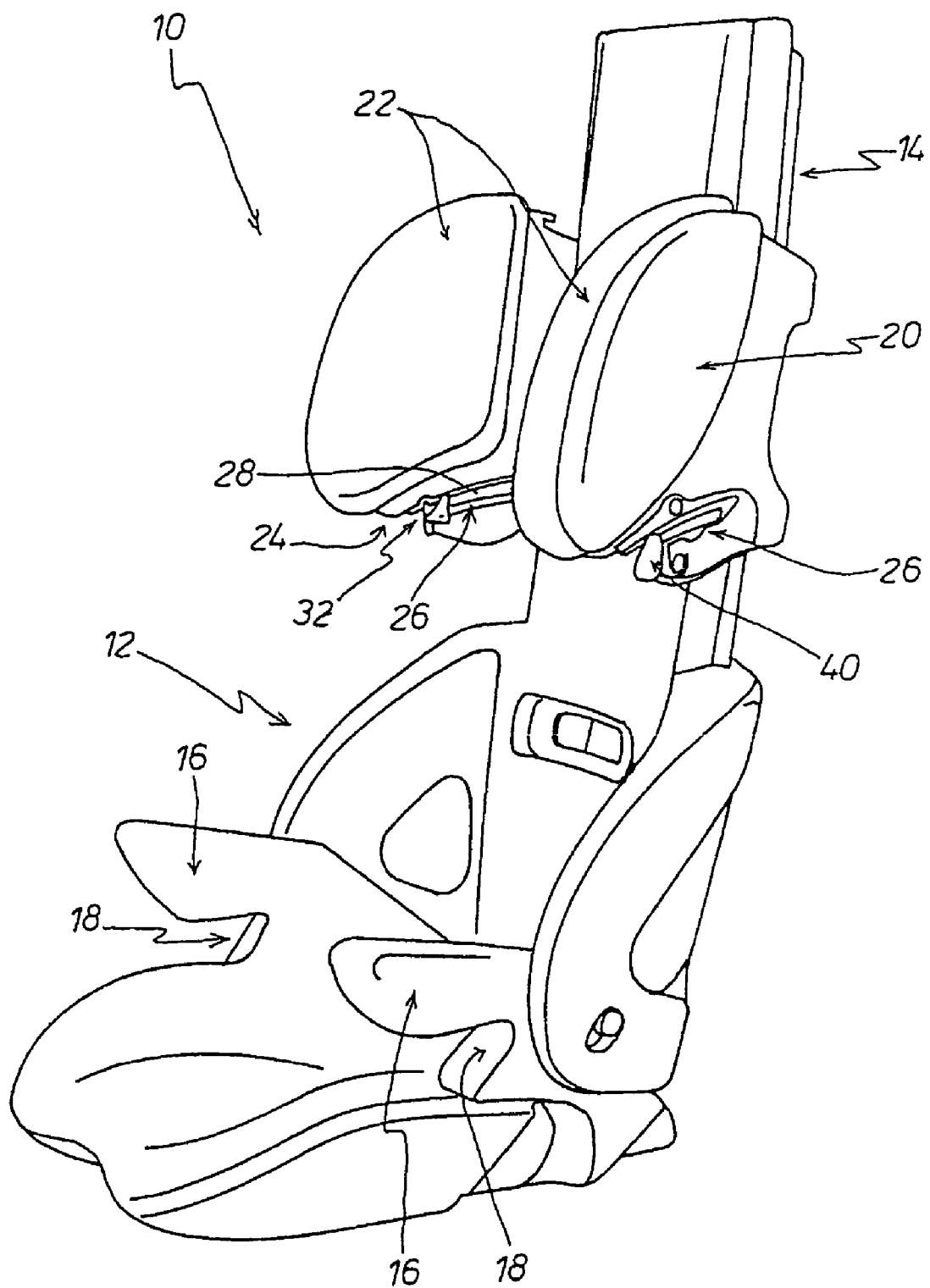
FIG. 1 shows a perspective view of the child seat.

FIG. 1 shows a design of the child seat 10 with a seat shell 12 and with a backrest 14 protruding upward from the seat shell 12. The seat shell 12 has armrests 16 and, under the armrest 16, a respective lap-belt guide 18 for a vehicle lap belt of a vehicle three-point belt.

Figure 2:
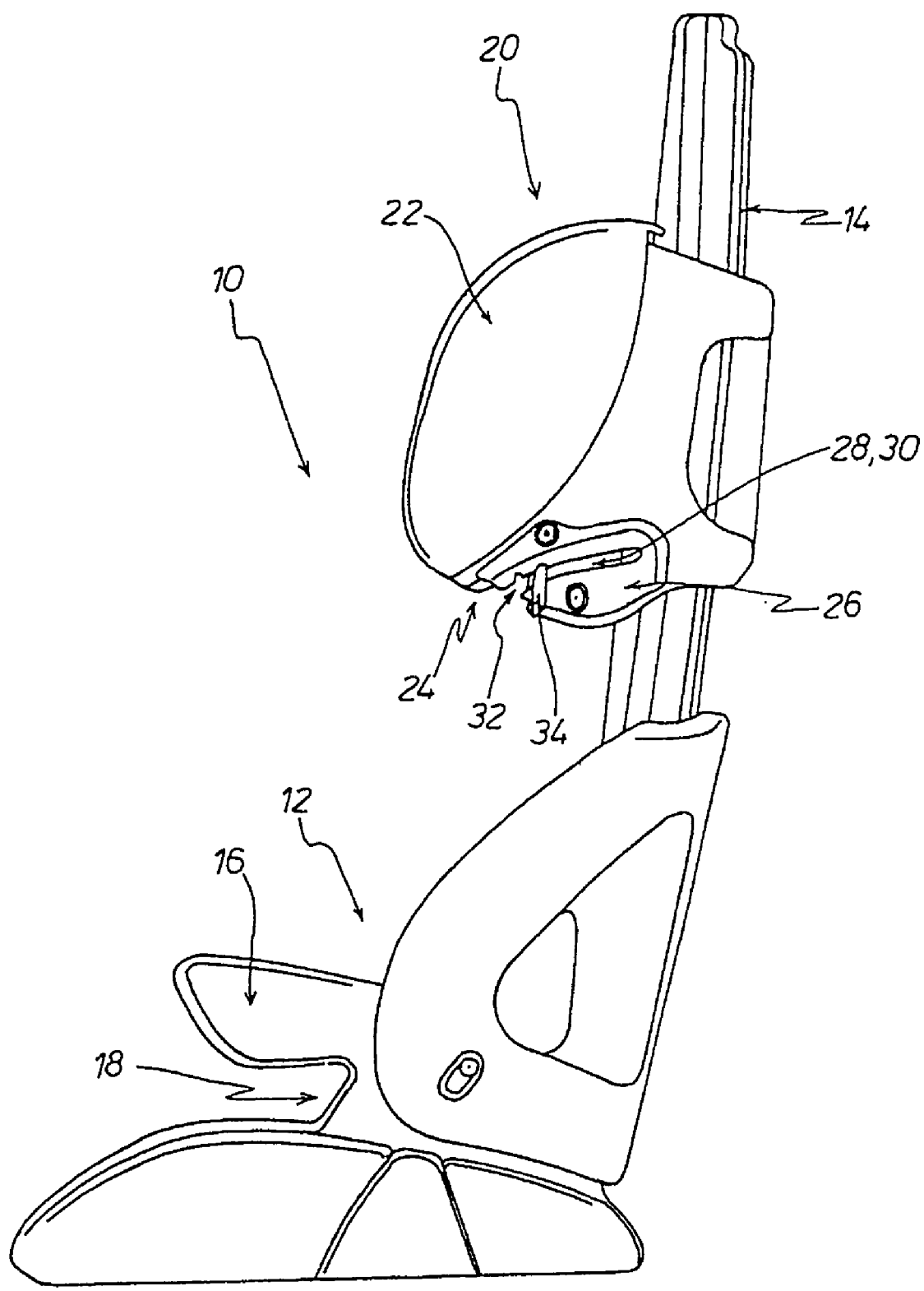
FIG. 2 shows a side view of the child seat according to FIG. 1.
Figure 3:
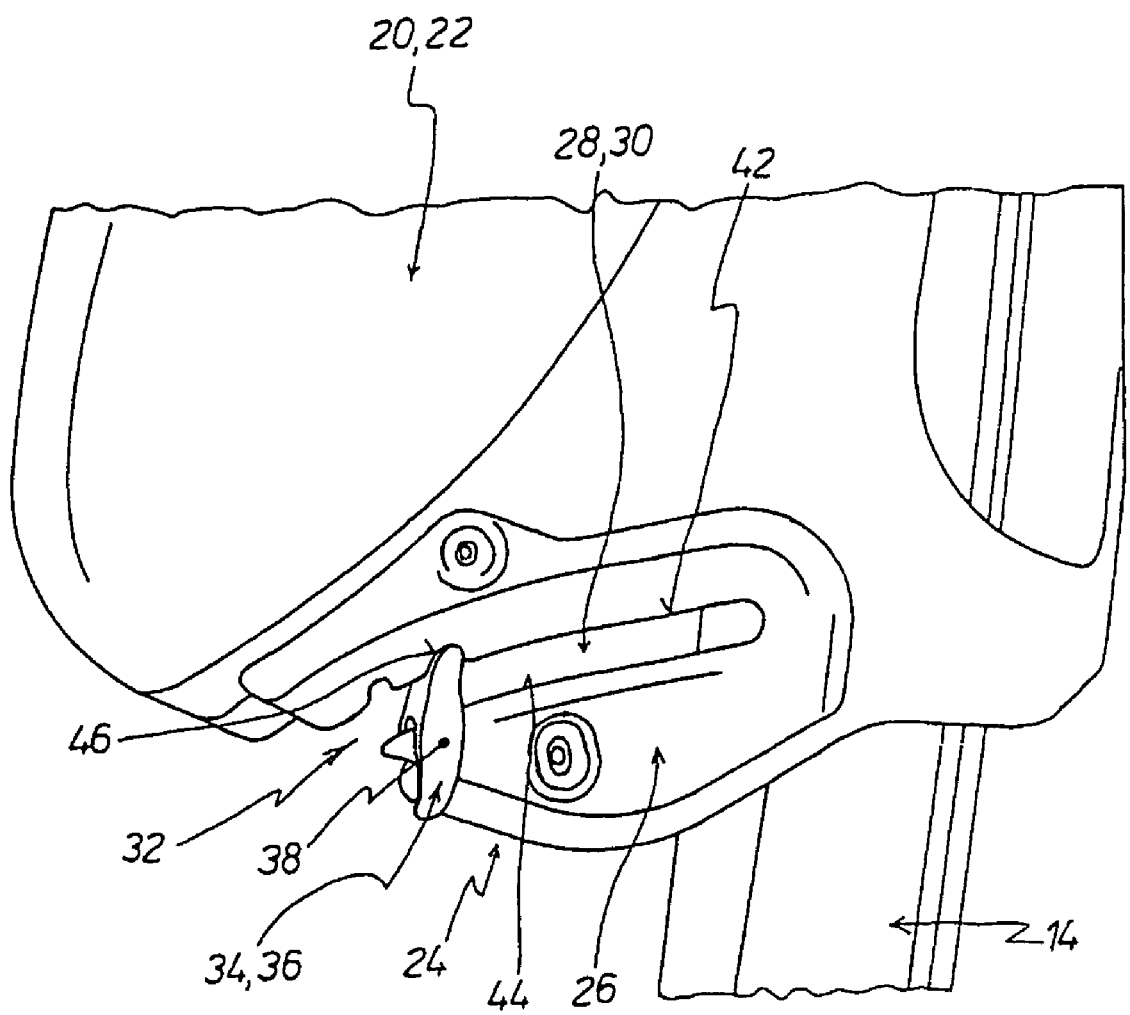
FIG. 3 shows part of a side view of the child seat according to FIGS. 1 and 2, with, in particular, a diagonal-belt guide and the closure element in the normal closure position being illustrated.
Figure 4:
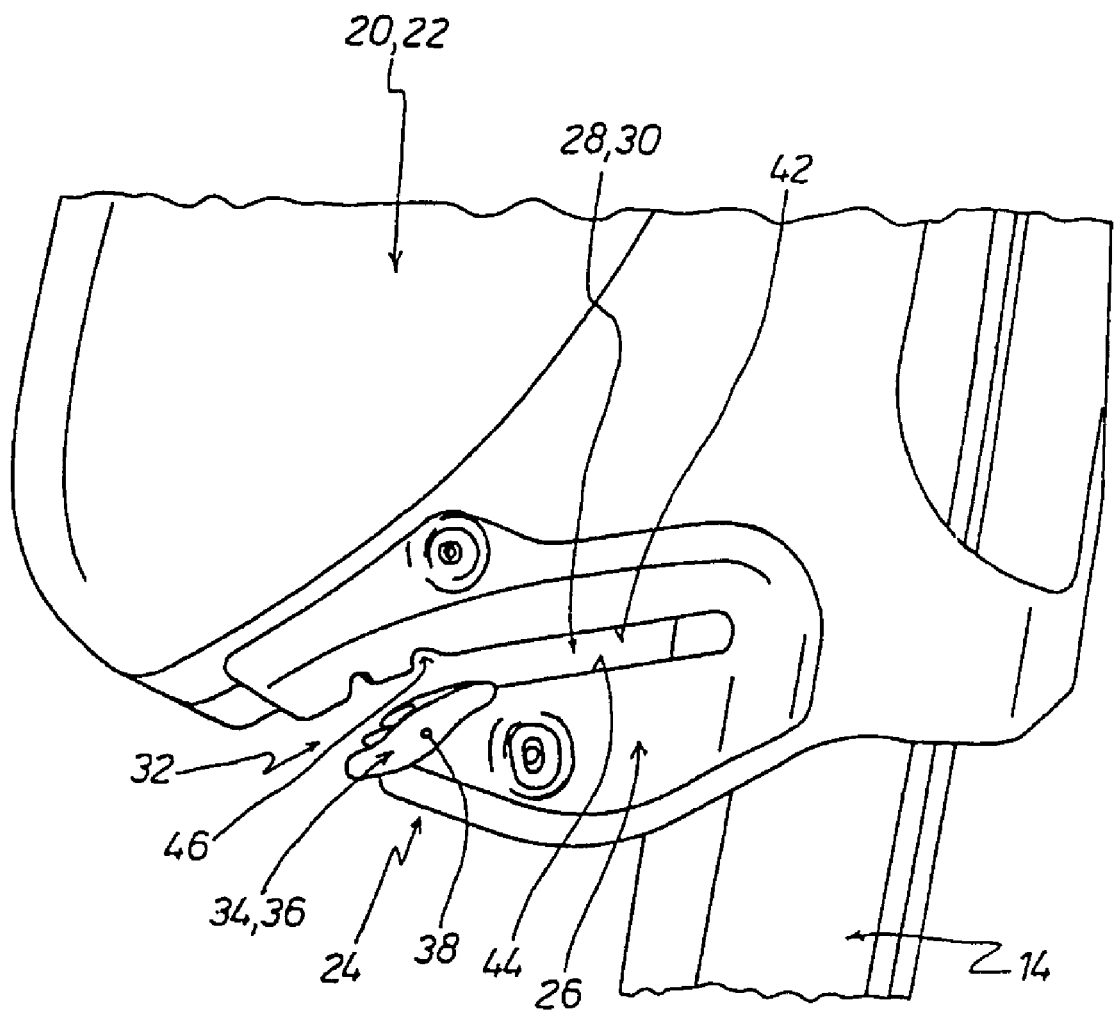
FIG. 4 shows an illustration similar to FIG. 3, the closure element being illustrated in the belt-threading-in position or belt-removing position.

A head restraint 20 which has two lateral flanks 22 is provided in a height-adjustable manner on the backrest 14. Each lateral flank 22 has a lower edge 24 on which a diagonal-belt guide 26 for a vehicle diagonal belt of the vehicle three-point belt is provided. As can also be seen from FIGS. 2, 3 and 4, the respective diagonal-belt guide 26 has a slot 28 which is open to the front, does not clamp the belt and forms a belt-retaining section 30 for the vehicle diagonal belt. The respective slot 28 has a front-side slot opening 32 on which a spring-loaded closure element 34 is provided. The respective closure element 34 is designed as a flap 36 which can be displaced about a spindle 38 between a normal closure position, as is illustrated in FIG. 3, and a belt-threading-in position and belt-removing position, as is illustrated in FIG. 4.

The respective closure element 34 is formed integrally with an actuating button 40 which is provided on the outer side of the corresponding lateral flank 22—in a manner which is unreachable by a child in the child seat 10.

The diagonal-belt guide 26 designed as a slot 28 is bounded by two edges 42 and 44. The edge 42 is designed with a cutout 46 (see in particular FIG. 4) in which the spring-loaded closure element 34 rests in a defined manner in the normal closure position (see FIG. 3). The spindle 38 about which the spring-loaded closure element 34 can be displaced between the normal closure position and the belt-threading-in position and belt-removing position is provided in the vicinity of the other edge 44 of the diagonal-belt guide 26 designed as a slot 28.

When a vehicle diagonal belt is threaded through the front-side slot opening 32 into the slot 28, the spring-loaded closure element 34 designed as a flap 36 is pivoted directly and immediately in the clockwise direction, with the prestress of the spring-loaded closure element 34 being correspondingly increased. As soon as the vehicle diagonal belt is situated in the slot 28, the spring element (not illustrated) of the spring-loaded closure element 34 can relax again, as a result of which the closure element 34 returns into the closure position shown in FIG. 3, in which the vehicle diagonal belt is reliably prevented from being removed from the diagonal-belt guide 26. For the desired removal of the vehicle diagonal belt from the diagonal-belt guide 26, the actuating button 40 of the spring-loaded closure element 34 is actuated in order to displace the closure element from the normal closure position into the belt-removing position shown in FIG. 4, after which the diagonal belt can be removed from the slot 28.

The same details are in each case denoted by the same reference numbers in FIGS. 1 to 4, although it is not necessary to describe all of the details in detail in each case in conjunction with all of the figures.

The invention claimed is:

1. A child seat with a seat shell which has a lap-belt guide for a vehicle lap belt, and with a backrest which has a front facing head restraint with lateral flanks, a respective diagonal-belt guide for a vehicle diagonal belt of a vehicle three-point belt being provided on the lateral flanks, the diagonal-belt guide having a slot with a front facing slot opening, does not clamp the belt and has a belt-retaining section, wherein the diagonal-belt guides are provided on a lower edge of the two lateral flanks of the head restraint, wherein the belt-retaining section directly adjoins the front facing slot opening of the slot of the respective diagonal-belt guide, wherein a spring-loaded closure element is provided for the front facing slot opening, the closure element enabling the vehicle diagonal belt to be threaded in a simple manner through the slot opening into the slot, blocking the slot opening in a normal closure position in a spring-loaded, prestressed manner, and being formed integrally with an actuating element which is provided on an outer side of the corresponding lateral flank, in a manner which is unreachable by a child in the child seat wherein the respective diagonal-belt guide on an upper edge thereof has a cutout in which the spring-loaded closure element rests in a defined manner in the normal closure position, and wherein the closure element is designed as a flap which can be displaced about a spindle provided in the vicinity of a lower edge of the slot, between the normal closure position and a belt-threading-in position or belt-removing position.

2. The child seat as claimed in claim 1, characterized in that the diagonal-belt guides are designed with a smooth surface.

3. The child seat as claimed in claim 1, characterized in that the head restraint is formed as a single part with the backrest.

4. The child seat as claimed in claim 1, characterized in that the head restraint is provided in a height-adjustable manner on the backrest.

* * * * *